United States Patent Office 3,299,459
Patented Jan. 24, 1967

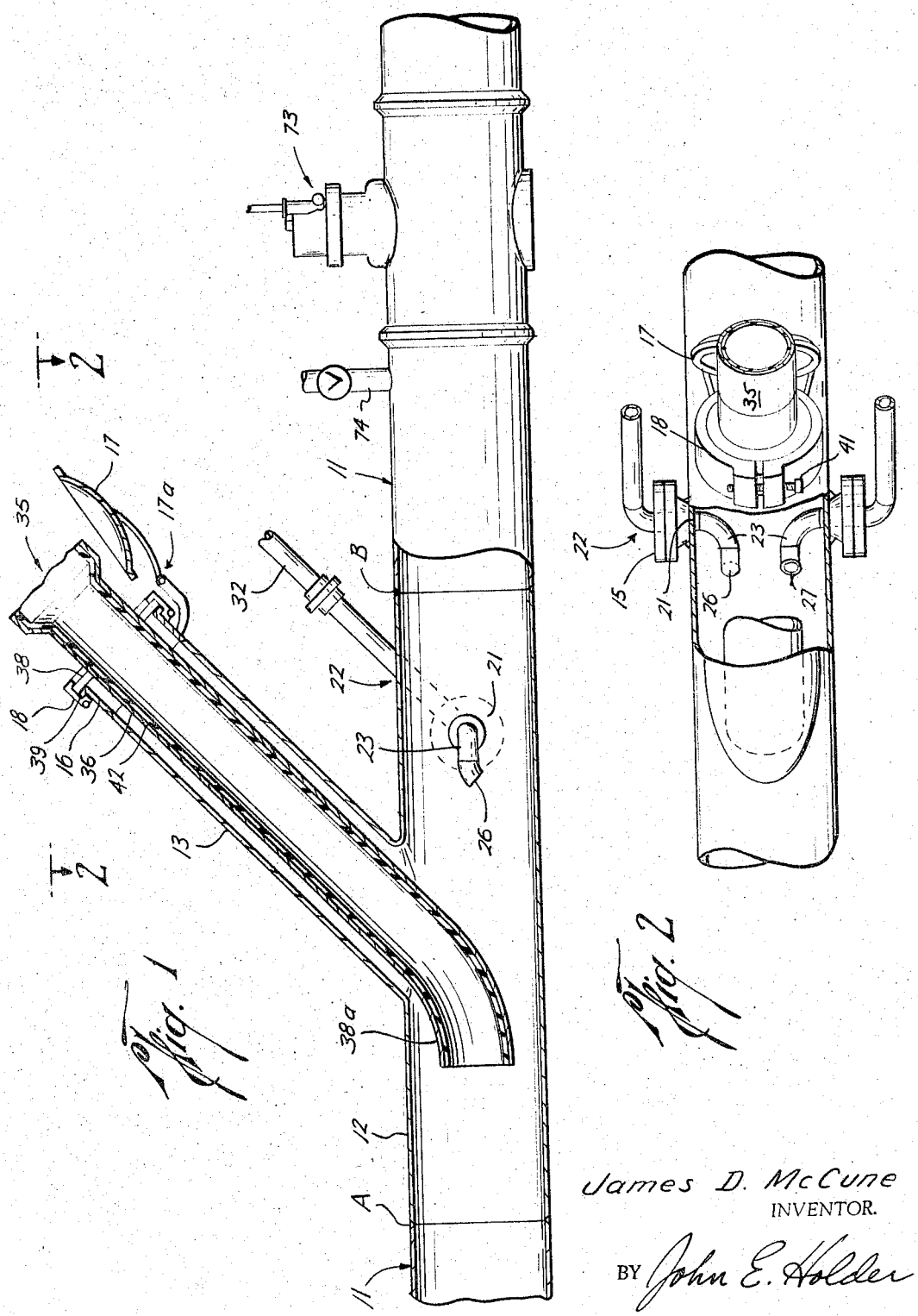

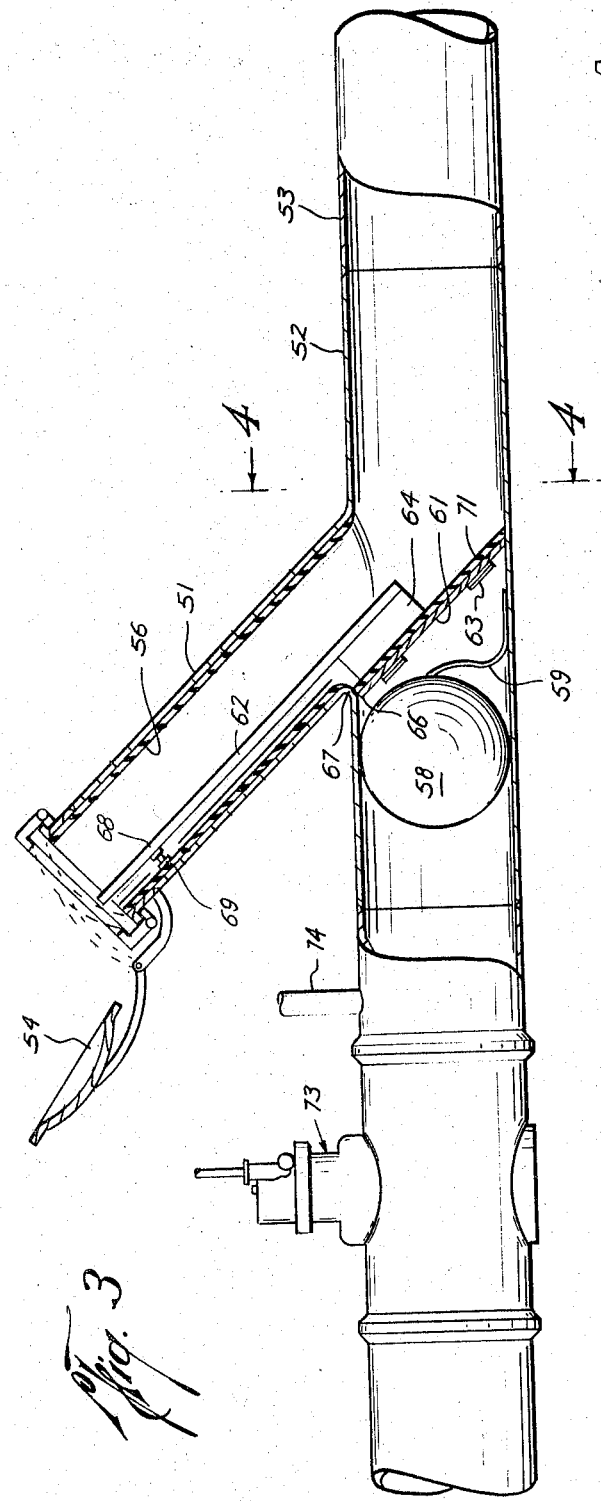
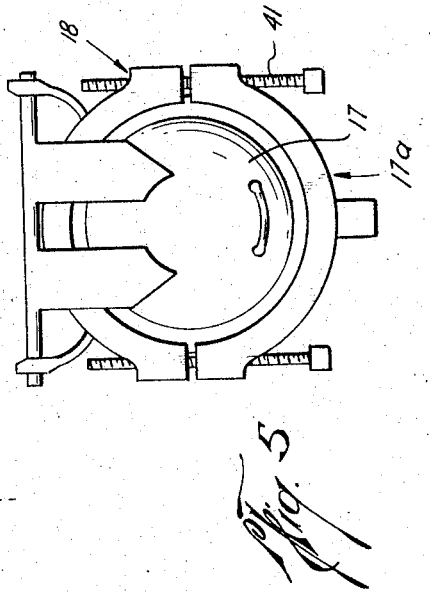
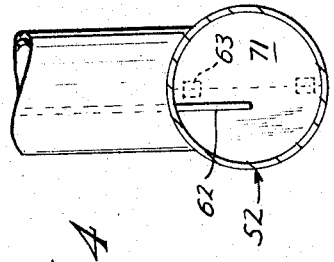

3,299,459
PIPELINE CLEANING APPARATUS
James D. McCune, La Porte, Tex., assignor to Schlumberger Technology Corporation, Houston, Tex., a corporation of Texas
Filed June 15, 1964, Ser. No. 375,037
10 Claims. (Cl. 15—3.51)

This invention relates to an apparatus for cleaning a pipeline and, more particularly, to an apparatus which provides for the rapid installation and removal of abrasive cleaning equipment to and from the pipeline.

A pipeline used for transportation of petroleum or chemical products over a period of time, will accumulate product residues on its walls. Corrosion and pitting of the walls also occurs. Therefore, for efficient transportation it is desirable from time to time to clean or scour the pipeline to remove such residues and clean the interior surface of the pipeline. The cleaning or smoothing of the interior surface of the pipeline provides for more efficient flow of product through the line. The occurrence of leaks in the line is minimized by removing pits from the pipe surface so that pockets of corrosive material cannot be formed.

Heretofore, to install cleaning equipment for cleaning underground pipelines, it has been necessary to uncover or otherwise expose both ends of the length of pipeline. This results in a large crater at each end of the pipeline and permits a section of the line at each end to be removed for installation of cleaning equipment. Since some pipelines require frequent cleaning operations, it can be appreciated that the cost of installing cleaning equipment can be considerable. Significant amounts of time are also involved in such an operation.

It is therefore an object of the present invention to provide an apparatus for performing periodic cleaning operations on pipelines without excavating around the line and cutting the line before each operation.

Another object of the present invention is to provide an apparatus for performing sand cleaning operations through permanent access openings placed in the pipeline to thereby minimize down time for maintenance on the pipeline.

With these and other objects in view, the present invention includes an apparatus for providing permanent access openings at spaced intervals along a pipeline. More particularly, the apparatus includes a short section of pipe permanently secured to either end of the pipeline to be cleaned, each of the sections having lateral access openings therein which provide access to the pipeline for the insertion of apparatus for maintaining the pipeline. This apparatus includes sand injection equipment to be placed in one of the access openings and sand deflection means in the other access opening to facilitate the discharge of the cleaning material on the downstream end of the pipeline. Additionally, means are provided upstream of the sand injection access opening for pressuring the pipeline and preventing sand from flowing in the pipe in a direction away from the discharge end of the pipe.

A complete understanding of this invention may be had by reference to the following detailed description when read in conjunction with the accompanying drawings illustrating an embodiment thereof, wherein:

FIG. 1 is an elevational view partially in section of an injection assembly embodying principles of the present invention;

FIG. 2 is a plan view partially in section of the injection end assembly taken along line 2—2 of FIG. 1;

FIG. 3 is an elevational view partially in section of a discharge assembly embodying principles of the present invention;

FIG. 4 is a cross-sectional view of the discharge end of the pipeline taken along line 4—4 of FIG. 3; and FIG. 5 is a plan view of a hinged closure for closing off the lateral access openings of the injection and discharge assemblies.

Referring first to FIG. 1, a short section of pipe 12 is welded at points A and B to a pipeline 11. A laterally projecting insert pipe 13 is connected to the short pipe 12 at an angle of approximately 45° to provide an inlet. Insert pipe 13 can be at any convenient angle to pipe 12 as the relative size of the pipeline 11 and pressures therein may require.

Closure means 17a (also shown in FIG. 5) are provided for the open end of insert pipe 13. The closure means 17a consists of a hub 16, welded to pipe 13, a hinged blanking cap 17 and a two piece yoke assembly 18.

Flanged openings 21 are provided on opposite sides of the pipe 12 at a location upstream (to the right in the drawing) of the entry opening of pipe 13 to pipe 12. Openings 21 when not in use can be capped with any suitable means (not shown). However, for cleaning operations, pipe assemblies 22 with flanges 15 are suitably attached to flanged openings 21 (see FIG. 2). Each pipe assembly 22 has a curved section 23 arranged to pass through the opening 21 to provide an open end within the pipe 12. Each section 23 has attached thereto short 45° elbows 26 and 27 respectively. Elbow 26 is arranged so that its open end faces the lower portion of the pipe 12 while elbow 27 is arranged so that its open end faces the upper portion of the pipe. Elbows 26 and 27 and sections 23 stop short of the central axis of pipe 12 and open toward the entry opening of pipe 13. Thus, if gas is passed through assemblies 22, the arrangement of elbows 26 and 27 will impart a swirling motion to such gas and direct it toward the entry opening of pipe 13. Each of assemblies 22 is adapted for an external connection to a gas inlet hose 32 coupled to a source or supply of gas under pressure.

The present invention preferably is adapted to cleaning of pipelines by use of abrasive material and gas flow. Hence, as shown in FIG. 1, a tubular injection device 35 can be inserted into the pipe 12 through the laterally projecting branch inlet pipe 13. Injection device 35 includes an injection pipe 36 sized to pass through pipe 13 and having a curved end 38a coaxially aligned with pipe 12. An annular flange 38 on pipe 36 is sized to close the open end of the pipe 12. Flange 38 is releasably attached to pipe 13 by means of the two piece yoke member 18 and a flanged edge 39 on the inlet pipe 13. When so attached the end of pipe 13 is sealed relative to injection pipe 36. It is noted that the same yoke member 18 is also used to sealingly hold the blankingcap 17 on the pipe 13. Injection pipe 36 has a neoprene lining 42 which protects the pipe from the influence of a flow of abrasive material therethrough. All the above apparatus taken together forms what will hereinafter be referred to as an injection end assembly.

Referring now to FIG. 3, a discharge end assembly is shown having a laterally projecting or branch outlet pipe 51 attached to a short section of pipe 52 which, in turn, is permanently installed in the pipeline 11. Pipe 51 is at an angle relative to pipe 52 opposite in inclination to the angle which pipe 13 makes with pipe 12. The discharge assembly can, for example, be spaced a distance of 6 miles from the injection end assembly. The laterally projecting outlet pipe 51 has a blanking cap or closure means 54 similar to that shown in FIG. 1. This closure means swings open as shown in FIG. 3 to provide an access for the insertion of discharge means into the pipeline. When closed as shown by the phantom lines in FIG. 3 the means 54 closes the branch outlet.

In order to divert a flow of abrasive material and gas from pipeline 11, deflecting means are provided for the branch outlet. Associated with the deflection means is a thin walled inflatable sphere 58 made of neoprene or other suitable material which can be positioned in the pipe section downstream of the opening of the branch outlet pipe 51. The sphere has a long tube 59 which is long enough to permit inflation of the sphere while positioned in the pipe from the external opening of the branch outlet pipe. Included in the deflection means is a diverter or deflecting plate means 61 (see also FIG. 4) which is secured to a jack bar 62. Bar 62 facilitates insertion of the collapsible diverter plate means into the pipe 52. The diverter plate means is comprised of two half sections which are connected by hinges 63. The jack bar 26 is connected to one of the half sections by means of a connecting member 64. The hinged construction of the deflection plate permits the plate means to be folded or collapsed upwardly to permit insertion of the plate means into the pipe 52 through the outlet pipe 51. The plate means is shaped so that as it unfolds in the pipe 52 at an angle therein, the plate means will completely close the cross-section of pipe 52. As the deflection plate is positioned within the pipeline, the upper edge 66 of the plate means engages a lip 67 formed by the intersection of the branch outlet 51 and the pipe 52. When so positioned, lifting the upper end 68 of the jack bar will tend to flatten out the hinged plate means and wedge the plate means within the pipeline to further close off the interior of the pipeline. A jack 69 which can be actuated from the mouth of the lateral pipe 52 is positioned on the upper end of the jack bar to perform the lifting operation which wedges and holds the plate means within the pipeline. The surface of the diverter plate means facing toward the injection assembly in the pipeline is covered with neoprene 71 or other suitable material. The interior surface of the branch outlet pipe 52 at the discharge end is also lined with neoprene to minimize cutting of the pipe.

FIG. 4 shows a cross-sectional view of the discharge end assembly with the collapsible diverter plate means 61 positioned in the pipe and attached to the jack bar 62.

In order to prepare a pipeline for abrasive cleaning operations, the short sections of pipe 12 and 52 with branch inlet 13 and outlet 51 are permanently installed in the pipeline preferably adjacent to and between mainline valves 73. Additionally, blowdown stacks 74 in the pipeline adjacent the valves 73 permit pressure in the pipeline to be bled off prior to working on the pipeline. With the permanent branch pipes 13 and 51 in the pipeline, it is no longer necessary to completely excavate around the ends of a pipeline section to be cleaned and install inlet and outlet sections. Instead, the necessary cleaning equipment is inserted into the pipeline through the permanently installed branch inlet and outlet pipes.

An abrasive or sand cleaning operation may be performed on a pipeline as follows: The yoke assembly which holds the hinged closure over the branch inlet pipe 13 is loosened and the blanking cap 17 is swung back to clear the end of the inlet pipe. A sand injection device 35 is inserted into the laterally projecting branch inlet pipe until the open outlet end of the sand injection pipe 36 is positioned in the short pipe section 12 so that the open end is axially aligned with the pipeline to be cleaned. A seal is effected between the injection pipe and the laterally projecting pipe by coupling the flange 38 on the injection pipe 36 to the pipe 13 by means of the yoke member 18. Next, gas inlet hoses 32 are connected to the pipes 28 extending upwardly from the small access openings in the pipeline upstream from the sand injection pipe 36.

At the other end of the length of pipe to be cleaned discharge means are placed in the discharge end assembly. In this respect, the inflatable sphere 58 is inserted into the pipeline downstream of the laterally projecting discharge pipe 51 and is inflated to completely block off the pipe and prevent the passage of sand around the sphere. Next, the jack bar 62 and diverter plate 71 are inserted into the short section of pipe 52 at the discharge end and the jack 69 is actuated to flatten out the diverter plate in the pipeline and thereby close off the pipe.

After the above preliminary steps have been taken, gas is applied to the gas inlet hose 32 to provide a pressure upstream of the injection pipe and thereby prevent sand from flowing upstream from the injection end. Next, a mixture of sand and gas is supplied to the injection pipe 36. Suitable apparatus and technique for this are disclosed in my U.S. Patent 3,073,687. This mixture is propelled through the pipeline by gas pressure until the slug of sand and gas mixture has passed through the pipe and out through the discharge end assembly, the mixture being deflected through the branch outlet by the diverter plate means. The upstream injection of gas through the inlet hose 32 will additionally cause the abrasive mixture to be swirled as it flows through the pipeline. This is due to the angle at which the elbows 26 and 27 introduce the gas into the pipeline.

Subsequent to the completion of necessary sand injections to clean the pipe, the injection pipe is removed from the injection end assembly by uncoupling the yoke member 18. The hinged closure door 17 is then replaced over the branch inlet and the yoke member is recoupled over the closure door and flanged end 39 of the branch inlet pipe. The gas inlet pipe assemblies 22 are removed and replaced by a blind flange (not shown) to close the smaller flanged openings 21. It is pointed out, however, that the pipe assemblies 22 may be closed off by a valve or other means and kept in place in the pipeline to avoid excavation about the pipeline in order to remove and reinstall the assemblies.

At the discharge end assembly, the jack 69 is deactuated to permit collapse and removal of the deflector plate from the pipeline through the laterally projecting branch outlet pipe. The sphere 58 is then deflated and removed from the pipeline through the branch outlet. The closure plate 54 and yoke member are secured over the branch outlet to condition the pipeline for normal use.

The pipeline is then placed back into service and when it is subsequently necessary to perform cleaning operation on the pipeline, the above process may be repeated utilizing the injection and discharge end assemblies to provide quick access to the pipeline and facilitate rapid cleaning operation on the pipeline.

While particular embodiments of the present invention have been shown and described, it is apparent that changes and modifications may be made without departing from this invention in its broader aspects and the aim in the appended claims is to cover all such changes and modifications that fall within the true spirit and scope of this invention.

What is claimed is:

1. Apparatus for use in abrasive cleaning of a pipeline comprising:
   pipe sections for permanent installation in a pipeline at spaced positions,
   first lateral access means in one of the pipe sections,
   means releasibly connectible with said first access means and insertable into said pipeline for injecting a particulate abrasive material and fluid carrier into said one pipe section,
   second lateral access means in the other pipe section sized for receiving particulate abrasive material deflection means, and
   deflection means for blocking the interior of said other pipe section at an acute angle relative to said other pipe section for diverting particulate abrasive material from said other pipe section.

2. Apparatus for use in abrasive cleaning of a pipeline comprising:
   short pipe sections for permanent installation in a pipeline at spaced positions, first lateral access means in one of the pipe sections for receiving particulate abrasive material injection equipment, second lateral access means in the other pipe section sized to receive particulate abrasive material deflection means, third lateral access means in said one pipe section for injecting a gas, said third access means being disposed at a location which is upstream of said first lateral access means, and pipe means projecting into the interior of said pipe through said first access means for introducing a particulate abrasive material into said pipe.

3. An apparatus for use in abrasive cleaning of a pipeline comprising:

a first pipe section for permanent connection in a pipeline, said first section having a lateral access opening therein, a second pipe section for permanent connection in a pipeline, said second section having an access opening therein, means removably connected to said access opening in said first pipe section and insertable into said pipeline for injecting a particulate abrasive cleaning material and fluid carrier under pressure into said pipeline to clean said pipeline, means removably positioned within said access opening in said second pipe section for deflecting said particulate abrasive cleaning material out of said pipeline through said access opening, and means for closing said lateral acccess openings upon disconnection of said injecting means and removal of said deflecting means so that a pipeline can be returned to service with said first and second short pipe sections permanently connected to the pipeline.

4. An apparatus for use in abrasive cleaning of a pipeline comprising:

a first pipe section for permanent connection in a pipeline, said first section having a large and small lateral access opening therein, said large opening having a diameter smaller than that of the pipeline, a second pipe section for permanent connection in a pipeline, said second section having a lateral access opening therein, means removably connected to said large access opening in said first pipe section for injecting an abrasive cleaning material under pressure into a pipeline to clean such pipeline, means removably positioned within said access opening in said second pipe section for discharging said cleaning material, means positioned in said first pipe section upstream of said abrasive material injection means in said small lateral access opening for preventing the abrasive material from flowing in a pipeline in a direction away from said discharge means, blocking means positioned in said second pipe section downstream of said discharge means for preventing passage of treating material pat said blocking means, and means for closing said lateral access openings upon removal of said injecting and discharging means so that such pipeline can be returned to service with said first and second short pipe sections permanently connected to the pipeline.

5. The apparatus set forth in claim 4 wherein said means positioned upstream of said injection means in said small lateral access opening is a gas supply pipe for pressuring the pipeline upstream of said injection means.

6. The apparatus set forth in claim 5 wherein said means positioned downstream of said discharge means in an inflated sphere which is inflated after being positioned in the pipe and deflated before removal to permit its insertion into and removal from the pipeline through the large access opening.

7. Apparatus for use in injecting abrasive material into a pipeline comprising:

a section of pipe for permanent installation in a pipeline, said section having a laterally projecting pipe extending therefrom, closure means for said laterally projecting pipe, said projecting pipe being sized to receive sand injection means, and lateral access means in said section of pipe for injecting gas, said lateral access means being at a location which is upstream from said laterally projecting pipe section and including pipe means extending through said lateral access means into said pipeline, with the exit end of said pipe means being aimed downstream toward said laterally projecting pipe section.

8. Apparatus for use in discharging materials transmitted under pressure through a pipeline including:

a section of pipe for permanent installation in a pipeline, lateral access means in said section of pipe, removable closure means for said access means, deflecting means insertable through said access means, said deflecting means being constructed and arranged to close the interior of said section of pipe yet leave said access means open, and inflatable means to be positioned in said section of pipe at a location which is downstream of said deflecting means for preventing flow of material.

9. Apparatus for use in abrasive cleaning of a length of pipeline which has spaced-apart sections, each section having lateral access means:

means for injecting a flow of particulate abrasive material and gas into the pipeline through one of said pipe sections to clean the interior of the length of pipeline, said injecting means being sized for reception within one of said lateral access means, and collapsible deflection means for insertion through said other lateral access means, said collapsible deflection means being expandable within a pipe section to block off the pipe section for deflecting particulate abrasive cleaning material to said other lateral access means.

10. The apparatus set forth in claim 9 and further including means for introducing gas under pressure to said one pipe section at a point spaced upstream from said one lateral access means for preventing upstream flow of abrasive material and providing an additional flow of gas.

References Cited by the Examiner

UNITED STATES PATENTS 914,824  3/1909  Greenan _____ 15—104.6 X

FOREIGN PATENTS 277,230  9/1930  Italy.

CHARLES A. WILLMUTH, *Primary Examiner.*

E. L. ROBERTS, *Assistant Examiner.*